United States Patent [19]
Szenasi et al.

[11] 3,921,533
[45] Nov. 25, 1975

[54] WHEEL ASSEMBLY FOR A VEHICLE MOVING THROUGH A TUBULAR CONDUIT

[75] Inventors: Freddy R. Szenasi; Richard M. Baldwin, both of San Antonio, Tex.

[73] Assignee: Tubexpress Systems, Inc., Houston, Tex.

[22] Filed: Sept. 18, 1974

[21] Appl. No.: 507,028

[52] U.S. Cl. .............................. 104/138 R; 243/33
[51] Int. Cl.² ........................................ B65G 51/04
[58] Field of Search .................. 243/32, 33, 38, 39; 104/138 R, 138 G, 139, 155, 156, 172 S; 105/365, 194, 209; 198/177 R, 177 T

[56] References Cited
UNITED STATES PATENTS

| 3,962 | 3/1845 | Ray | 105/209 X |
| 394,161 | 12/1888 | Dulles | 104/138 R X |
| 562,023 | 6/1896 | Pike | 243/33 |
| 1,656,995 | 1/1928 | Wenzel | 105/194 X |
| 3,099,227 | 7/1963 | Bryan | 104/139 |
| 3,508,497 | 4/1970 | Matsukata | 104/138 R |
| 3,626,863 | 12/1971 | Trost | 105/209 X |
| 3,734,428 | 5/1973 | Alexandrov | 243/33 |

FOREIGN PATENTS OR APPLICATIONS

| 717,569 | 2/1942 | Germany | 243/33 |
| 2,110,941 | 10/1971 | Germany | 243/33 |

Primary Examiner—Evon C. Blunk
Assistant Examiner—James L. Rowland
Attorney, Agent, or Firm—Fulbright & Jaworski

[57] ABSTRACT

A wheel assembly for supporting each end of a vehicle moving through a pipeline. An axle is connected to each end of the vehicle extending coaxially with the longitudinal axis of the vehicle and a hub is rotatably connected to each axle for allowing spiraling of the wheel assembly. A plurality of struts are connected to and radially extend outwardly from each hub and spaced apart an equal distance. A wheel supporting bracket having first and second ends is pivotally connected to the outer end of each strut midway between the first and second ends of the bracket. A wheel is connected to each end of each bracket whereby when one wheel is positioned to be loaded both wheels will be loaded thereby reducing the unit contact load between the wheels and the interior of the pipeline. A shock absorber is connected to each strut for absorbing longitudinal shock through the strut and a shock absorber is connected to each bracket for each wheel for absorbing the impact shock through the wheel. The bracket may include two shafts having a limited pivotally connection thereto for supporting the wheels.

10 Claims, 5 Drawing Figures

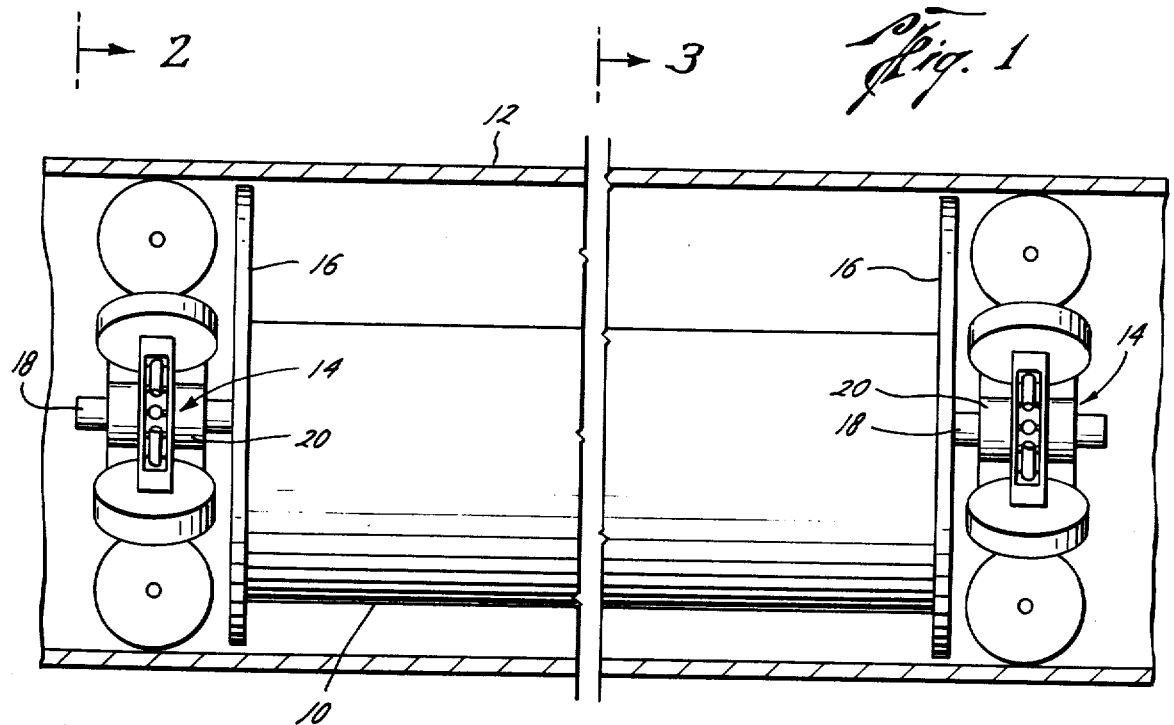
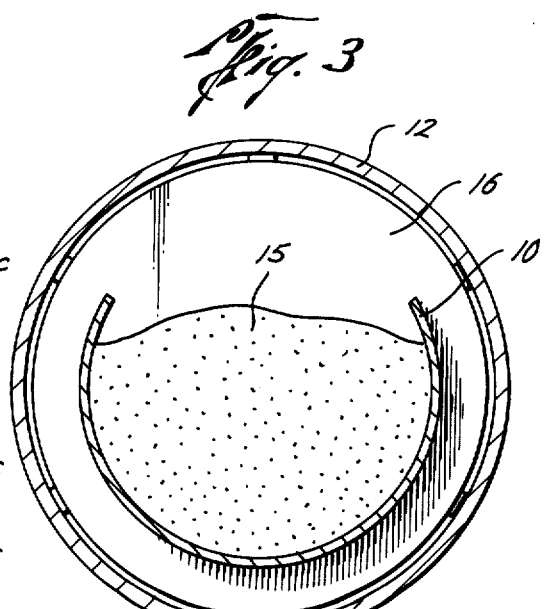

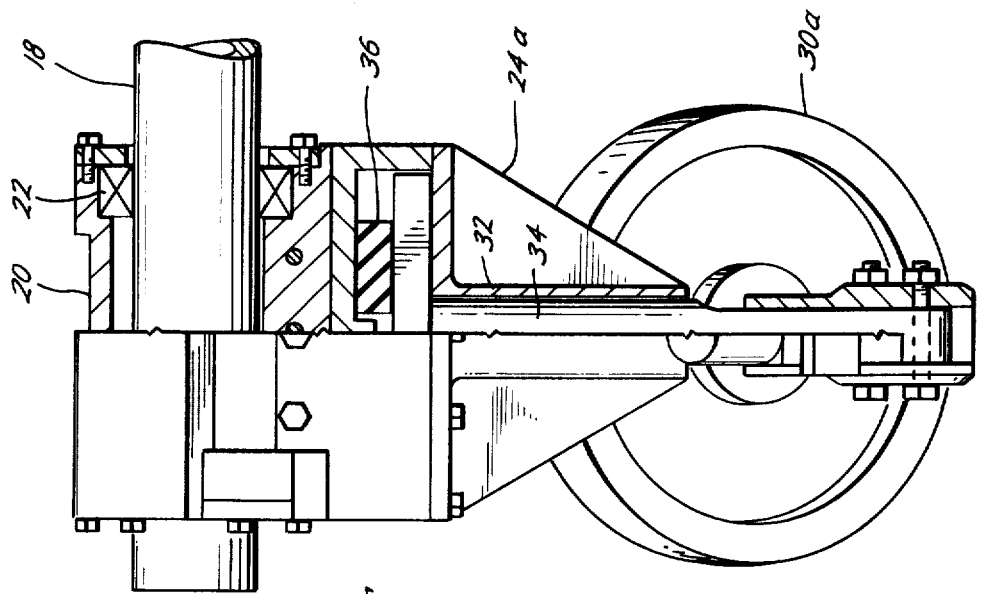
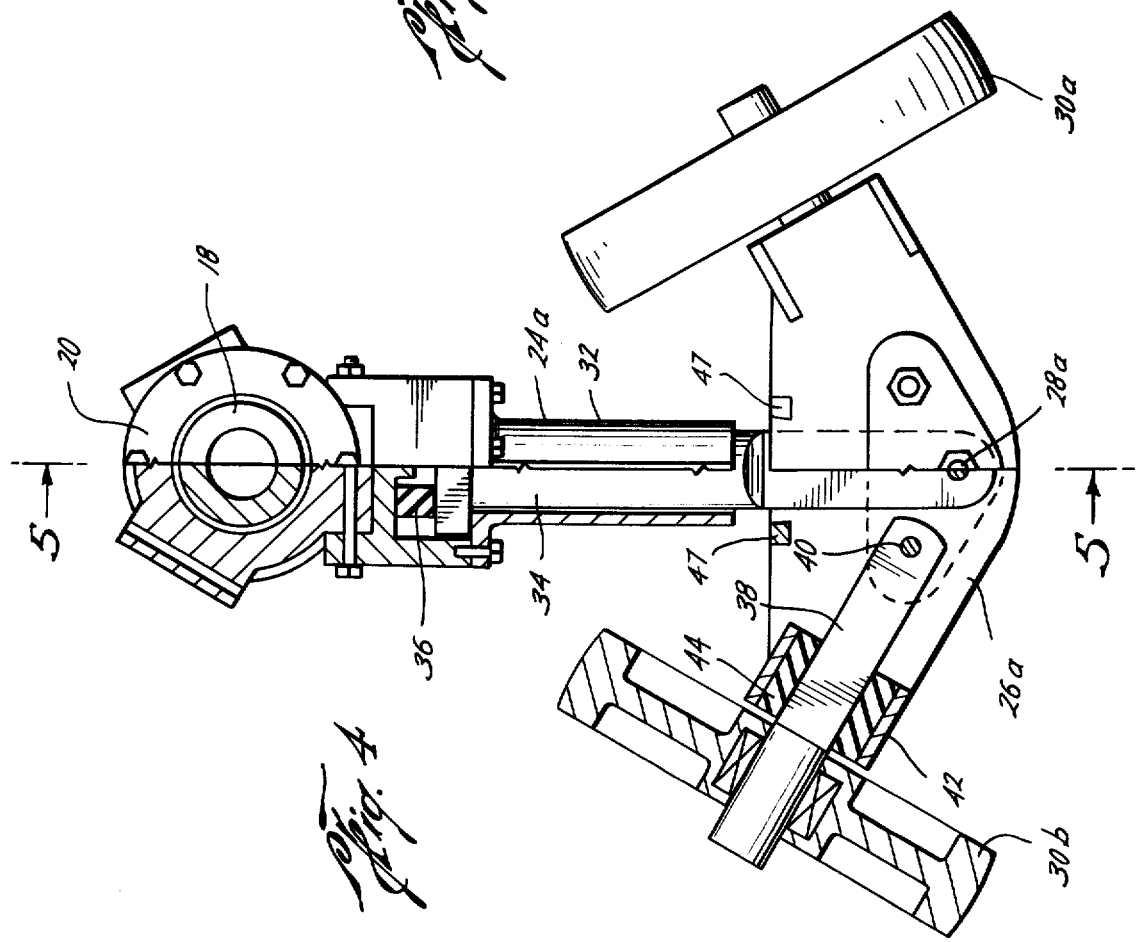

WHEEL ASSEMBLY FOR A VEHICLE MOVING THROUGH A TUBULAR CONDUIT

BACKGROUND OF THE INVENTION

U.S. Pat. No. 3,797,405, issued Mar. 19, 1974 discloses a vehicle moving along the interior of a pipeline by flowing air in which the vehicle is supported for movement along the pipeline by a plurality of radially spaced wheels which are mounted rigidly to the vehicles. Such vehicles are subject to overturning in the pipeline due to either misaligned wheels or centrifugal forces which tend to cause the cars to spiral or climb the pipe walls on turns. U.S. Pat. No. 3,734,428, issued May 22, 1973 discloses a wheel assembly for a vehicle in which a plurality of wheels are supported from a rotatable hub about the axis of the vehicle which allows the wheel assembly to spiral or rotate relative to the vehicle body, and avoids the overturning problem. However, it is important that a wheel assembly have a low coefficient of rolling friction, low contact stresses between the wheels and the interior of the pipe, minimum pipe wear, avoids the need for wheel alignment, a shock system to minimize vibration transmitted to the vehicle, the ability to overcome environmental conditions such as debris or imperfections in the pipeline, and the ability to operate in pipelines which are out of round and have an oval configuration.

The present invention is directed to a wheel assembly having a structure which will overcome the problems encountered for carrying a vehicle through the pipeline.

SUMMARY

The present invention is directed to a wheel assembly for supporting each end of a vehicle moving through a tubular conduit in which an axle is connected to each end of the vehicle and extend coaxial with the longitudinal axis of the vehicle and a supporting hub is rotatably connected to each axle for supporting the wheel assembly therefrom in which the wheel assembly may rotate or spiral relative to the vehicle which will minimize the possibility of the vehicle overturning in the conduit. A plurality of struts are connected to and extend radially outwardly from each hub for supporting wheels which ride on the interior of the conduit. A wheel supporting bracket is pivotally supported intermediate its ends from each strut and two wheels are supported from each bracket. One of the wheels is supported on one side of the strut and the other of the wheels is supported on the opposite side of the strut whereby each pair of wheels supported from each bracket will be equally loaded thereby maximizing the number of wheels in contact with the pipe for reducing the contact stresses between the wheel assembly and the interior of the conduit even in the event that the conduit is out of round.

Preferably, the wheel assembly is provided with three struts spaced 120 degrees apart for supporting six wheels equally spaced about the interior of the pipe circumference.

Still a further object of the present invention is the provision of a shock absorber connected to each strut to protect the wheel assembly from longitudinal impact loads encountered in the pipeline. In addition, a shock absorber may be provided between each wheel and its connecting bracket for overcoming impact shocks in the event the wheels encounter imperfections in the pipe or debris therein.

Still a further object of the present invention is the provision of a shaft for each wheel which is provided with limited pivotal movement relative to the supporting bracket for providing additional flexibility and safety in the wheel assembly.

Other and further objects, features and advantages will be apparent from the following description of the presently preferred embodiment of the invention, given for the purpose of disclosure, and taken in conjunction with the accompanying drawings.

BRIEF DESCRIPTION OF THE DRAWINGS

FIG. 1 is an elevational view, partly in cross section, illustrating a vehicle embodying the wheel assembly of the present invention moving through a tubular conduit, FIG. 2 is a cross-sectional view taken along the line 2—2 of FIG. 1, FIG. 3 is a cross-sectional view taken along the line 3—3 of FIG. 1, FIG. 4 is an enlarged fragmentary elevational view, partly in cross section, illustrating the construction of one of the struts and its supporting wheels of the present wheel assembly, and FIG. 5 is a cross-sectional view taken along the line 5—5 of FIG. 4.

DESCRIPTION OF THE PREFERRED EMBODIMENT

Referring now to the drawings, and particularly to FIG. 1, the reference numeral 10 generally indicates a vehicle moving through a tubular conduit or pipeline 12 and supported by two wheel assemblies of the present invention, generally indicated by the reference numeral 14. While the vehicle 10 is shown as including end plates 16 for providing a high drag surface on which air moving through the conduit 12 acts to move the vehicle 10 through the conduit 12, as more fully described in U.S. Pat. No. 3,797,405, the wheel assemblies 14 may be utilized on other types of vehicles moving through a tubular conduit 12.

Referring now to FIGS. 1, 2, 4 and 5, an axle 18 is provided connected to each end of the vehicle 10 and extend coaxially with the longitudinal axis of the vehicle 10 for providing the support for a wheel assembly 14 at each end of the vehicle 10.

Each wheel assembly 14 includes a hub 20 rotatably supported from each axle 18 by a suitable bearing 22 for rotatably supporting the wheel assemblies 14 from the axles 18 to allow spiraling or rotational movement of the wheel assemblies 14 relative to the container 10 whereby the wheel assemblies 14 may spiral along the inside of the conduit 12. Thus the container 10, as best seen in FIG. 3, will always maintain an equilibrium position with respect to gravitational or centrifugal forces which will minimize the possibility of the vehicle 10 overturning in the pipeline 12 and dumping its load 15 in conduit 12.

A plurality of load supporting struts, here shown as three struts 24a, 24b and 24c are shown having one end connected to and radially extending outwardly from each hub 20. Preferably, the struts 24a, 24b and 24c are spaced equally about the hub 20, here shown as 120 rotational degrees. A bracket is pivotally supported intermediate its end from each strut for supporting a pair of wheels. Thus, bracket 26a is supported from the outer end of strut 24a by a pivot 28a with the bracket 26a positioned in a plane perpendicular to the axis of the vehicle 10. Wheels 30a and 30b are supported from the bracket 26a on opposite sides of the pivot 28a and are positioned in a radial plane directed along the path of movement of the vehicle 10. Similarly, bracket 26b is supported from pivot 28b from strut 24b and supports wheels 30c and 30d. Similarly, bracket 26c is supported from strut 24c by pivot 28c and in turn supports wheels 30e and 30f. The wheels 30a, 30b, 30c, 30d, 30e and 30f are preferably equally spaced around the interior of the circumference of the pipeline 12.

Pivotally connecting each pair of wheels to its supporting strut insures that the wheel loads on each pair of wheels is distributed equally. For example, refer to wheel pairs 30e and 30f. Normally, if all of the wheels were fixedly secured to the vehicle 10, the wheel 30f would be under load, but the wheel 30e would be under no load. However, with the present invention with the wheels 30e and 30f connected around the pivot 28c, wheel 30e will carry a load equal to the load of wheel 30f thereby reducing the unit contact stresses between the wheels and the interior of the pipe 12. Thus, the pivoting pair of wheels reduce excessive contact stresses which could result in pitting, galling or rutting of the pipeline 12. In addition, the pivoting pairs of wheels in the preferred embodiment shown insure that there are always a maximum number of wheels, four wheels in the preferred embodiment, in contact with the interior of the pipe 12 to insure a minimum contact stress. In addition, the load is distributed over a portion of the upper portion of the pipe 12 as well as the bottom portion of the pipe 12. That is, the wheels are loaded if the angle of their supporting strut is plus or minus 120 degrees from the bottom of the pipe 12 and the wheel loads themselves actually range over an angle of 300 degrees of the pipe thereby spreading out the wear on the pipeline over a greater surface. It is to be further noted that the pivoting pairs of wheels maintain good contact and minimize contact stress of the wheels within out of round pipe whereas wheel systems in which the wheels are in a rigid circle would not work satisfactorily in an oval pipe as fewer wheels would be in contact with the oval pipe and would result in high contact stress and localize wheel and pipe wear. The present structure allows the outer circumference of the wheel assemblies 14 to be designed for the minimum radius in order to pass through the smallest cross section of pipe, which can vary in actual practice, and also to pass through pipe which is out of round and yet maintain a maximum number of wheels in contact with the pipe to satisfactorily carry the loads required. In the study of one application of the present invention, it was found that the six wheel system was advantageous over an eight wheel system which, while satisfactory, increases the weight of the wheel assemblies. It is further noted that wheels 30c and 30d, shown in FIG. 2, would be under no load and would reduce the rolling friction of the wheel assemblies 14.

Of course, the pipeline 12 in which the vehicle 10 travels may have welds or other imperfections, and as best seen in FIGS. 4 and 5, the strut, only one of which, such as 24a shown, contains a shock system to overcome shocks when the wheel assembly hits imperfections in the pipe 12 or debris in the line 12. The strut 24a may include telescoping sections 32 and 34 in which a shock absorber such as a dense piece of rubber 36 is provided between the abutting ends thereof. In addition, the wheels, may be mounted on shafts 38 connected to the bracket such as 26a by a pivot 40 which is movable within limits between a circumferential stop 42 in which is also provided a shock absorber 44. The shock absorber 44 and pivoting shaft 38 allows limited movement of the wheels to overcome shocks encountered by hitting impediments in the conduit 12.

Referring still to FIG. 4, stops 47 are provided on the bracket 26a positioned adjacent but spaced from the strut 34, thereby allowing but limiting rotation of the bracket 26a about the pivot 28a. Therefore, the bracket 26a has a limited rotational movement around the pivot 28a to provide the safety feature that in the event one of the wheels 30a or 30b is damaged, the remaining wheel will carry the load through the stop and strut and continue to allow the vehicle 10 to run.

In general, the wheels of a wheel assembly should be of a maximum diameter to reduce the rolling resistance and of a maximum width to reduce the contact stresses, while at the same time should be of the lightest weight and of a practical diameter. The present structure allows a wheel assembly to carry the loaded vehicle 10 in the system properly, even in an oval pipe, and results in a minimizing of contact stresses and also aids in distributing the wear over a large area of the pipe.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts may be made without departing from the spirit of the invention and the scope of the appended claims.

What is claimed is:

1. A wheel assembly for supporting each end of a vehicle moving through a tubular conduit comprising,
   an axle connected to each end of the vehicle extending coaxial with the longitudinal axis of the vehicle,
   a hub rotatably connected to each axle,
   a plurality of struts connected to and radially extending outwardly from each hub,
   a wheel supporting bracket pivotally supported intermediate its ends from each strut by a pivot having an axis substantially parallel to said axle, and
   two wheels supported from each bracket, one of said wheels supported on one side of the strut and the other of said wheels supported on the opposite side of said strut whereby each pair of wheels supported from a bracket will be equally loaded.

2. The apparatus of claim 1 including,
   a shock absorber connected to each strut.

3. The apparatus of claim 1 wherein the struts are equally spaced from each other about said hub and all of the wheels are equally spaced radially about the hub.

4. The apparatus of claim 1 wherein three struts are provided spaced 120 degrees apart, and six wheels are provided radially spaced 60 degrees apart.

5. The apparatus of claim 1 including,
   a shock absorber connected to each bracket for each wheel.

6. The apparatus of claim 1 including, means limiting the pivoting movement of the bracket from its supporting strut.

7. A rotating wheel assembly for supporting each end of a vehicle moving longitudinally through the interior of a tubular pipe comprising, an axle connected to each end of the vehicle and extending coaxial with the longitudinal axis of the vehicle, a hub rotatably connected to each axle, a plurality of struts connected to and radially extending outwardly from each hub, said struts spaced equal circular distances apart, a wheel supporting bracket having first and second ends pivotally connected to the outer end of each strut at midway between the first and second ends of the bracket by a pivot having an axis substantially parallel to said axle, and a wheel connected to each end of each bracket.

8. The apparatus of claim 7 wherein the struts include telescoping members and include a shock absorber for absorbing longitudinal shocks through the struts.

9. The apparatus of claim 7 including, a shaft for each wheel, said shafts pivotally connected to said bracket, and a shock absorber between said bracket and said shaft limiting the pivoting movement of said shaft.

10. The apparatus of claim 7 wherein the wheels are equally spaced around the outer circumference of the assembly.

* * * * *